ையPatented Jan. 19, 1971

3,556,838
PROCESS FOR COATING ACTIVE IRON AND THE COATED IRON
Marnell A. Segura, Baton Rouge, La., assignor to Esso Research and Engineering Company, a corporation of Delaware
No Drawing. Continuation-in-part of application Ser. No. 591,124, Nov. 1, 1966. This application July 23, 1969, Ser. No. 845,936
Int. Cl. C23f 9/02; B44d 1/36
U.S. Cl. 117—100                                 15 Claims

ABSTRACT OF THE DISCLOSURE

Chemically active and water absorbent surfaces of reduced iron ore are treated to render them water-repellent by treatment with a mixture comprising polymerizable silicones and polymerizable olefins having an average carbon number ranging from $C_{20}$ to about $C_{60}$, thereby forming a protective film on the surface of the iron.

CROSS REFERENCE

This application is a continuation-in-part of Ser. No. 591,124, filed Nov. 1, 1966.

BACKGROUND OF THE INVENTION

This invention relates to the art of water-proofing active forms of metallic iron. In particular it relates to the art of water-proofing powdered reduced iron ore or compactions of such powders.

It is known to prepare metallic iron in forms which expose very high surface areas. Typical of such forms are those obtained by the direct reduction of iron ores, especially by the fluidized reduction of iron ores. In a typical process oxidic iron ores in particulate forms ranging from less than about 1,000 microns and averaging about 50 to 400 microns in size are reduced at high temperatures with reducing gases. The ore is maintained in fluidized condition by direct contact with gases at temperatures ranging generally from about 900° F. to about 1800° F., or up to the sintering temperature of the ore. In advanced processes of this type, fluidized beds of ore are staged as separate reduction zones and the ore is progressively reduced in each zone. For example, hematite ore, consisting principally of ferric oxide, is charged to a first fluidized bed or beds and the oxide is reduced with reducing gases such as carbon monoxide, hydrogen, or mixtures of these and other gases to form magnetic oxide of iron (magnetite). In subsequent beds, the magnetic oxide of iron is further reduced to ferrous oxide, or wustite. Finally the ferrous oxide is reduced in additional beds to obtain highly metallized products ranging generally from about 80 to about 95% metallic iron.

The highly metallized reduced ore product has extremely high surface areas due to its very finely divided state. As a consequence of such high surface areas, certain problems are encountered in the handling, storage and use of these products. For example, the products often possess a high chemical activity and have a substantial tendency to reoxidize or backoxidize in the atmosphere converting them back to oxidic forms of iron. This, of course, is uneconomical and causes great deterioration of product quality. More importantly, there is often a tendency for the iron to absorb moisture and to liberate hydrogen, which may result in fires or otherwise represent a safety hazard.

It has been felt desirable to modify the form of finely-divided iron or reduced ore products to lessen their tendency to generate hydrogen in contact with moisture or to backoxodize to oxides of iron. One method for achieving this involves compressing, compacting, or pelletizing the powdered iron into larger forms having lessened exposed surfaces, such as briquettes, pellets, extrudates and the like. However, it has been found that unless extremely high pressures, high temperatures or both are applied, complete compression of the reduced iron ore to solid forms cannot be achieved. Thus, the resulting compactions are generally quite porous and may have a porosity ranging as high as 30% or higher. At such porosities the exposed surface areas are so great that deleterious moisture absorption, backoxidation, and/or hydrogen generation can still occur.

One such method for rendering the surfaces of active metallic iron in particulate form or in the form of porous compactions passive and water-repellent is described in U.S. application Ser. No. 591,124, filed Nov. 1, 1966. That application describes a method by which a liquid dispersion or solution of a silicone or silicones is applied to the surface of the active metal particles or compactions to form a film. After curing, the silicone film is water-insoluble and water-repellent so that it acts as a barrier which prevents penetration of the metal particles by the atmosphere and by moisture. Unfortunately, substantial quantities of the silicones are require to passivate the iron surfaces and this may, in certain cases, be relatively expensive. Moreover, for certain uses excessive quantities of silicones may be undesirable impurities.

It has also been found that excellent passivation and water repellency of reduced iron ore particles or porous compactions can be achieved by dipping the particles at high temperatures ranging from about 300° F. to about 700° F. into a liquid bath of olefinic hydrocarbons comprised generally of olefins, diolefins, polyolefins, dimers, trimers, tetramers and the like of average carbon number ranging from about $C_{20}$ to about $C_{45}$. The olefinic hydrocarbon mixture preferably contains about 2 to about 15% polyenes or dienes, or both. Especially preferred are the cyclodienes. The relatively high temperature of the metallic surfaces, during the dipping process, causes polymerization of the olefins which results in a hydrophobic discontinuous film on the active surfaces which renders these metallic surfaces passive.

The use of the olefinic hydrocarbon treatment offers substantial economic advantages over the silicone treatment. Unfortunately, however, substantial experimentation with the olefinic hydrocarbon treatment indicates that passivation or protection against water adsorption and backoxidation lessens significantly when the amount of olefin polymer on the metal surfaces drops below about 0.2 wt. percent, and particularly when it drops below about 0.1 wt. percent. Thus, it is generally desirable to use more than about 0.2 wt. percent olefin polymer to adequately passivate and water-proof the metallic iron surfaces. Additionally, the use of the silicone enhances the water repellency of the coating, i.e., significantly extends the useful life of the coating. For some uses there is no objection to using above about 0.2 wt. percent polymer. However, in certain instances in the steel industry, e.g., when large quantities of the treated metal are added simultaneously or over a short period to a steelmaking furnace, excessive smoke or fire, or both, are emitted due to combustion of the polymer. This has been found to be objectionable and, consequently, there is a need in the art to develop a technique for passivating active metallic iron surfaces inexpensively while using only small amounts of carbon-containing or otherwise smoke-producing materials.

SUMMARY OF THE INVENTION

This invention contemplates a process for passivating and water-proofing active surfaces of reduced iron ore by contacting the surfaces at selected conditions with a silicone or silicones greatly diluted with normally liquid olefins or mixtures of certain kinds of olefins with relatively low concentrations of silicones at time and temperature conditions sufficient to induce penetration of the olefin-diluted silicone into the capillary pores and crevices of the reduced iron ore particles. Upon curing, the olefin-silicone mixture produces discontinuous hydrophobic resinous deposits which render the ore particles passive or resistant to backoxidation and water-repellent.

The resin or polymer of olefins and silicones on the reduced ore can be used in amounts less than about 0.2% and preferably between about 0.01 and 0.1% by weight, based on metallic iron. Even at this low concentration of surface film, excellent passivation and water resistance is achieved. Thus, the amount of silicone used can be extremely small. In fact, the silicone is preferably diluted to a concentration of about 0.05 to 1.0% based on total silicone and olefinic liquids. Preferably, the silicone comprises only about 0.1 to 0.25% of the total silicone and olefinic liquids. Thus, the percent of silicone based on metallic iron ranges from only about 0.0005 to 1.0%, preferably only about 0.001 to 0.25%.

Additionally, the use of the silicone-diluted liquid olefin treatment greatly reduces the amount of olefin polymer necessary on the metallic surface. Consequently, this invention has the advantage of reducing the smoke-forming tendency of the olefin polymer.

Any types of active iron surfaces can be beneficially treated in accordance with the present invention. However, it is especially contemplated to use powdered reduced iron ores of sizes conventionally produced from fluidized ore reduction processes. It is also especially suitable to use the instant invention for passivating briquettes, pellets or other porous compactions of reduced iron ore obtained from high pressure/high temperature briquetting or pelletizing. The passivating process of this invention is especially advantageous for use with porous compactions having porosities above about 10 to 15% since it is at or above these levels that backoxidation and water adsorption are especially acute.

Silicones suitable for use in accordance with the present invention can be either oil-soluble or water-soluble and may be illustrated by those dimetallo-substituted organo silane diols characterized by the formula:

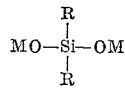

or, more accurately:

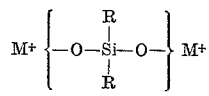

wherein R is hydrogen or a monovalent organo radical, or hydrocarbyl radical, such as alkyl, aryl, aralkyl, alkaryl or the like, whether substituted or unsubstituted, and whether the R's of the $(R)_2Si(O^-)_2$ moiety are the same or different; and M is Group I or alkali metal of the Periodic Chart of the Elements.

Preferably, R is an alkyl or aryl radical containing from 1 to about 6 carbon atoms, e.g., methyl, ethyl, propyl, butyl, phenyl and the like, and M is lithium, sodium, potassium, or the like.

These types of silicones can be formed by reaction between organo silane diols and alkali metal hydroxides, e.g., by reaction between dimethyl silane diol and sodium hydroxide. The reaction is generally carried out in solution.

It is believed that the silicones of this invention react with water and carbon dioxide in a manner similar to the reaction between silanols, which condense to form polysiloxane. Thus, in the presence of water, or in a water solution $(CH_3)_2Si(ONa)_2$ becomes ionized, as represented by the following:

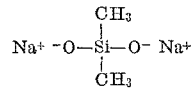

The individual molecules can react in accordance with the following:

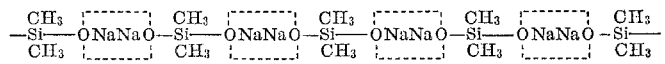

The liberated sodium oxide, $Na_2O$, reacts with carbon dioxide, $CO_2$, to form an aqueous solution of sodium carbonate, $Na_2CO_3$. The liberated $(CH_3)_2SiO=$ moieties link together to form polysiloxane, having more than three repeating units, as represented by the following formula:

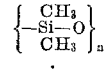

wherein $n$ is an integer ranging generally from about 3 to about 20, or more preferably from about 5 to about 10.

To form these repeating units—viz., $(CH_3)_2SiO=$, it is necessary that the silicone compound be difunctional in its reaction. Thus, it is essential that not less than two alkali metal atoms of the molecule be bonded, each through an oxygen atom, to silicon. A monofunctional molecule is not capable of propagating a sufficiently long polymeric chain. A greater number of functional groups produces cross-linking.

Exemplary of siliconate monomers suitable in accordance with the present invention are sodium methyl siliconate $(CH_3)_2Si(ONa)_2$, lithium ethyl siliconate $$(C_2H_5)_2Si(OLi)_2$$

potassium n-isobutyl siliconate $(C_4H_9)_2Si(OK)_2$, sodium phenyl siliconate $(C_6H_5)_2Si(ONa)_2$, and the like.

The normally liquid olefin hydrocarbons suitable for use in the present invention comprise polymerizable acyclic and cyclic olefins, diolefins, triolefins, especially dimers, trimers, and tetramers of such olefins. Especially suitable are olefin admixtures of such compounds which contain dimers, trimers, and tetramers of cyclopolyenes and cyclodienes. For best results, the hydrocarbon admixture should contain from at least about 2%, preferably about 2% to about 15%, and more preferably from about 5% to about 10% polyenes or dienes, or both, based on the total weight of olefins in admixture. Preferably, the dienes are cyclodienes. Suitable hydrocarbon mixtures can be formed by admixing commercial products and residuals. For example, suitable olefinic liquid hydrocarbon mixtures can be obtained by admixing polyenes or dienes, or both, with commercially available olefinic liquid hydrocarbons such as obtained by steam cracking naphthas to obtain olefinic mixtures, which are then partially polymerized over hot clay. The source of polyenes or dienes, itself, can also be a commercial mixture. The resultant olefinic hydrocarbon mixture employed consists generally of olefins, diolefins, polyolefins, dimers, trimers, tetramers, and the like, of average carbon number ranging from about $C_{20}$ to about $C_{60}$, and more particularly from about $C_{30}$ to about $C_{45}$.

The viscosity of the liquid olefin hydrocarbon mixture preferably ranges from about 100 SSU (ASTM D-8-53) to about 250 SSU, and preferably from about 150 SSU to about 230 SSU, and can be readily controlled, if desired, by incorporation of solvents. The liquid olefin hydrocarbon is readily soluble in aromatic, paraffinic, and chlorinated hydrocarbons, acetates, ketones and relatively high molecular weight alcohols. Dialkyl sulfoxides, e.g., dimethyl sulfoxide, have been found particularly useful as solvents, penetration of the olefin hydrocarbons into the pores and crevices of the metals being achieved quite rapidly and efficiently. Driers can also be added, if desired. Suitable driers are, e.g., iron tallate, iron naphthanate, iron oxide, manganese oxide, and the like.

After mixing the appropriate amount of silicone with the hydrocarbon liquid mixture, iron or reduced ore briquettes, or powders, at elevated temperatures are immersed, dipped, sprayed or otherwise contacted with the silicone-olefinic hydrocarbon mixture, dried and then cured to produce hydrophobic, discontinuous, resinous, or resin-like deposits within the capillary pores and crevices, thus rendering the so-treated metals impervious to penetration, especially by moisture, and hence resistant to change upon exposure to various environments which tend to produce back oxidation. The treated metals thus become highly impervious to attacks by noxious gases, fumes, liquids and other materials, and particularly resistant to penetration by moisture, water or other aqueous media.

The briquettes or metal powders are contacted with the silicone-containing olefinic liquid hydrocarbon mixture while the latter is maintained at temperatures sufficient to induce limited penetration by the olefinic hydrocarbons into the capillary pores and crevices of the metal, without substantial decomposition of the said olefinic liquid hydrocarbons. Generally, the temperature of the metal surface during initial contact ranges from about 300° F. to about 700° F., and preferably from about 400° F. to about 600° F. Temperatures within this range produce better and more durable penetration of the pores with less olefins being required. There is little or no advantage in maintaining temperatures above about 700° F. for moisture-proofing. On the other hand, temperatures below about 400° F. are unsatisfactory inasmuch as a film is formed which does not penetrate and which produces excessive quantities of smoke-forming resins. Moreover, the products are sticky, which is particularly undesirable for many uses of metal powder. Furthermore, below this temperature, excessive amounts of olefins are absorbed. Internal temperatures can exceed these temperatures. The contact time of the metal is not sufficiently long to produce decomposition of the heat reactive olefinic liquid hydrocarbon. Olefin temperatures greater than about 300° F. are generally unsatisfactory inasmuch as vapor losses of olefins are excessive. Preferably, olefin temperatures should not exceed about 200° F. On the other hand, at temperatures below about 150° F., the olefins are too viscous for effective penetration. With diluted solutions, lower temperatures are satisfactory.

Contact time is to some extent dependent on the temperature of both the metal and the silicone-containing olefinic hydrocarbon. During immersion or dipping, e.g., the temperatures of both are controlled by contact time, but to a large measure these variables also control the extent of penetration and ultimate formation of durable resin-like deposits within the capillary pores and crevices. Film formation is to be avoided, as well as excessive penetration of the liquid mixture into the metal. On the other hand, penetration must be sufficient to effect a water barrier for the pores and crevices, and the barrier must be adequate to withstand environmental factors and conditions. Suitable contact times between the metal and liquid for achieving proper penetration into the capillaries and crevices, at specified temperatures, ranges generally from about 2 to about 30 seconds, and preferably about 5 to about 20 seconds. After such contact, from about 10 to about 30 seconds are allowed for excess liquid to drain from the metal surfaces.

The residual heat left in the hot metal after contact and withdrawal from the liquid is sometimes adequate to effect drying and substantial curing of the polymers and cause the formation of resinous deposits within the capillary pores and crevices of the metal. In any event, some degree of curing will be effected and, over a sufficient period of time, will be completed. Curing can readily be completed within from about 5 to 60 minutes, and generally from about 15 minutes to about 45 minutes, by contact with air, preferably at temperatures of at least about 50° F., preferably ranging from about 60° F. to about 300° F. and, more preferably, from about 70° F. to about 200° F. The surface of the metal is thus dried, cooled and then cured by natural or forced air convection. The curing of the polymer results in immediate moisture-proofing, while the silicone will cure by the presence of water (moisture) and/or carbon dioxide to give additional, and longer lasting, moisture-proofing.

In the early or initial withdrawal of the metals from the reduction reaction stages, the metals are normally first cooled from reduction temperatures by contact with inert gases, mild reducing or oxidizing gases, a spray of water or steam, and cooled to immersion, dip or contact temperature. In accordance with a preferred embodiment, metallic iron from a direct iron ore reduction process can be simultaneously quenched and moisture-proofed. Pursuant thereto, briquettes or iron powder, at reduction temperatures ranging from about 1000° F. to about 1800° F., and preferably from about 1000° F. to about 1400° F., can be contacted with an aqueous emulsion or dispersion of the silicone-containing olefins. Oil-in-water or water-in-oil emulsions are satisfactory. Such emulsions are formed by admixing from about 20 percent to about 80 percent, and preferably from about 40 to about 60 percent, of the silicone-containing olefin hydrocarbon mixture with water or other aqueous media, based on the weight of the emulsion. The intensely hot metallic iron is then dipped, sprayed or otherwise contacted with the emulsion at very short contact times, ranging from about 0.5 second to about 30 seconds, and preferably from about 1 second to about 10 seconds, to reduce the temperature of the metal to below about 600° F., and preferably below about 500° F., after which time the metal surfaces are drained of excess liquid and further cooled and cured by contact with ambient air, or by natural or forced air circulation.

Pursuant to the practice of this invention, even particulate metal or powders, which contain carbon in concentrations ranging from about 1 percent to as high as 8 percent or more can be effectively moisture-proofed, and then compacted or pressed into briquettes which are substantially moisture-proof. Heretofore, briquettes formed from such high carbon content powders were too porous for practical use, unless larger quantities of coating material were used.

A key and novel feature of this invention resides in the very nature, manner of deposition, and formation of the resin-like material within the capillary pore surfaces and crevices. Benefits can be obtained at concentrations ranging from about 0.01 percent to about 0.7 percent of the deposited material, and results are generally optimum at concentrations ranging from about 0.05 percent to about 0.2 percent, based on the total weight of impregnated metal. It is indeed amazing that such minute amounts of silicone-olefin based deposited material can function so effectively in preventing moisture penetration. Excellent results are achieved with amounts of silione-olefin mixtures much smaller than is the case when either the silicone or olefinic material is used alone.

DESCRIPTION OF THE PREFERRED EMBODIMENTS

In the following selected demonstrations and examples, a reduced iron product is obtained by charging a raw natural hematite ore to the top or initial stage of a reactor containing a series of four fluidized beds. The ore is progressively reduced, upon descent from one bed to the next of the series, by treatment with an ascending gaseous mixture of hydrogen and temperatures ranging from an initial 1400° F., to 1500° F. in the final fluidized bed. The particulate reduced iron product, 95 percent metallized, is withdrawn from the final stage of the reactor at 1430° F. Portions of the powder are compacted in a roll-type press to form briquettes of size (in inches) 3⅝ x 2¼ x 1⅝, and portions of powder, per se, are treated with liquid olefin hydrocarbon (except as otherwise specified) of the following approximate chemical and physical composition:

Average carbon number: $C_{30}$–$C_{35}$
Cyclodienes, wt. percent: 7–10
Gravity, API (ASTM D 287–55): 10–13
Viscosity, SSU at 210° F. (ASTM D 88–53): 210–220
Flash, COC, ° F. (ASTM D 92–52): 280
Iodine number, cg./g. (ASTM D 555– 54): 240–255
Ash, wt. percent: 0.06
Nonvolatile matter, wt. percent (ASTM D 154-53): 95
Color, Gardner (1 g. olefin in 67 ml. water white xylene) _____ 10
Acid number, mg. KOH/g. _____ 0.1
Saponification number, mg. KOH/g. _____ 3.18
Surface tension, dynes/cm. _____ 44.5
Distillation at 10 mm. (ASTM D 1160), ° F.:
    IBP _____ 182
    5% _____ 298
    10% _____ 326
    20% _____ 377
    30% _____ 425
    40% _____ 464
    50% (cracked) _____ 504

To the olefinic hydrocarbon liquid is added amounts of silicone additive as indicated in the examples included herein.

Liquid olefin hydrocarbons suitable for the practice of this invention include partially polymerized acyclic and cyclic monoolefins, diolefins, and multiolefins, and preferably dimers, trimers and tetramers thereof, whether straight chained or branched chained and whether substituted or unsubstituted, to provide an average carbon number ranging from about $C_{20}$ to about $C_{60}$, and preferably from about $C_{30}$ to about $C_{45}$. Exemplary of such species of olefins are, e.g., acrylic acid, methacrylic acid, ethyl acrylate, butene-1, butene-2, 2-methyl-1-propene, pentene-1, ethyl methacrylate, polytetrafluoroethylene, isobutene, 3-methyl-1-butene, 3-hexene, 3-methyl-2-pentene, 3 - ethyl-3-hexene, 3,3 - dimethyl-2-ethyl-1-butene, 3,3,6 - trimethyl - 1 - heptene, 1 - tridecene, 6 - butyl-6 - undecene, 1 - heptadecene, 9 - octadecene, 2 - methyl-1 - nonadecene, penta - isobutylene, 1 - tetracosene, 9-octyl - 8 - heptadecene, hepta - isobutylene, 17 - pentriacontene, 1,4 - butadiene, 1,3 - butadiene, isoprene, 2-chloro-1,3 - butadiene, 3-methyl-2,5-hexadiene, 6-methyl-1,4-heptadiene, 1,5-nonadiene, 3-ethyl-1,5-octadiene, 1,10-undecadiene, 4-butyl-1,10-undecadiene, 2-methyl - 2,14-tricosadiene, 1,3,5-hexatriene, dodecatriene, and the like, and dimers, trimers and tetramers of such compounds. Illustrative of cyclic monoolefins, diolefins and multiolefins of such character are, e.g., 1,5-dimethyl-2-phenyl-3-pyrazolone, cyclopentadiene, 1,4-epoxy-1,3-butadiene, 1-thia-2,4-cyclopentadiene, 1-aza-2,4-cyclopentadiene, 1,2-benzofuran, thianaphthene, 1-propyl-1-cyclopentene, 1-methyl-2-propyl-1-cyclopentene, 1 - amyl-1-cyclopentene, 1 - decyl-1-cyclopentene, 1-hexadecyl-1-cyclopentene, 1-methyl-3-octadecyl - 1 - cyclopentene, cyclohexene, 1,2,3-trimethyl-1-cyclohexene, 1 - amyl-2-methyl-1-cyclohexene, cyclooctene, cyclopentadecene, cycloheptadecene, 1,2- cycloheptadiene, 1,3-cyclooctadiene, 1 - methyl-4-ethyl-1,3-cyclohexadiene, 1 - methyl-3-propyl-4-isopropyl-1,3-cyclohexadiene, 1,16-cyclotriacontadiene, 1,10-dimethyl-1,16-cyclotriacontadiene, 1,3,5-cycloheptatriene, 1,3,5 - cyclooctatriene, and the like, and dimers, trimers and tetramers of such compounds.

Partial polymerization products, viz., dimers, trimers, tetramers, and the like, of these and other liquid olefin hydrocarbons, and reaction products of the same or different named molecular species and others are suitable in the practice of this invention. It is entirely unnecessary to use pure compounds. Commercial mixtures, residuals, plant side streams, and the like, which include mixtures of these and other compounds, can be readily utilized. Side streams and residuals from the same or different processes can be mixed together to provide suitable liquid olefin hydrocarbons.

A suitable commercial mixture of liquid olefin hydrocarbons is one obtained by steam cracking naphthas to obtain, after removal of unreacted naphtha and cyclopentadiene, an olefinic mixture of average carbon number ranging $C_5$ to $C_{7+}$, or $C_5$ to $C_{20}$, and higher. This mixture is partially polymerized by contact at elevated temperatures, e.g., from about 250° F. to about 350° F., with a low volatile matter acid clay (Attapulgus) to form olefins of average carbon number ranging from about $C_{20}$ to $C_{60}$, and preferably from about $C_{30}$ to about $C_{45}$. The mixture contains largely acyclic olefins, viz., monoolefins and diolefins, dimers, trimer, tetramers, and the like. While the mixture contains some cycloolefins, i.e., from about 1–3 percent by weight, the addition of cyclopolyenes and cyclodienes greatly enhances the utility of the stream for use in the process of this invention. Suitably from about 4 to about 7 percent by weight of additional cyclopolyenes is added to the mixture to form a mixture ranging from about 7–10 percent cyclopolyenes and cyclodienes. The mixture is heat-reactive and, because of the highly unsaturated character of the mixture (Iodine Number 220–225), it dries and cures on the metal surfaces to form resinous deposits within the capillary pores and crevices by both oxidation and polymerization.

EXAMPLE 1

This example shows the advantage of utilizing a combination of olefins and siliconate in reducing the amount of polymer pickup on a passivated reduced iron ore briquette. Reduced iron ore briquettes obtained from the direct fluidized reduction of iron ores and at a temperature of 600° F. were dipped in passivating bath at 200° F. for 10 seconds and allowed to drain for 10 seconds. The olefin polymer was formed by partially polymerizing a $C_5$ to $C_{7+}$ cut of a steam cracked naphtha at 250° F. to 350° F. over an Attapulgus clay. The siliconate was a methyl silicone resin dissolved in a Stoddard solvent meeting the requirements of Federal Specification SS–W–00110 (GSA–FSS) and having the following properties:

Viscosity at 77° F.: 3.0 centipoises
Specific gravity: 8.65
Flash point (closed cup): 115° F.
Percent silicone solids: 33%

The silicone resin is available commercially as Dow Corning 773 Water Repellent.

Bath formulation:             Percent polymer pickup
    Polymer only _____ 0.31
    Polymer +1% siliconate _____ 0.16

Other additives used in place of the siliconate did not reduce polymer pickup. Such other additives tested included: ethylene glycol, Aerosol OT (a sodium dioctylsulfosuccinate wetting agent), WITCO Formex 77–86 (a coupling agent), glycerine, decyl alcohol, oleic acid, cotton seed oil, Emulphor EL–719 (a non-ionic emulsifying agent, e.g., polyoxyethylated vegetable oils, alcohols and fatty acids), and Nuosperse 657 (a combination of polyester surface active agents).

EXAMPLE 2

This example points out the excellent weatherability of the siliconate+polymer passivation treatment. The test results were obtained in a weatherometer which measures water pickup, the percent water pickup also being a function of back oxidation tendency. In this example, briquettes similar to those used in Example 1, at 500° F., were dipped in a passivating bath. The bath contained 6% polymer (similar to that used in Example 1)

in Varsol[1] plus the indicated amounts of siliconate The dip time was 5 seconds and coating was 0.1 wt. percent of the total briquette weight.

| Silicone solids on polymer, wt. percent | Percent H₂O pickup in weatherometer* test at— | | | | |
|---|---|---|---|---|---|
| | 0 hrs. | 48 hrs. | 96 hrs. | 144 hrs. | 288 hrs. |
| 100% polymer | 0.20 | 1.9 | 3.2 | 3.5 | |
| Polymer plus 1% siliconate | 0.10 | 0.12 | 0.20 | 0.20 | |
| Polymer plus 0.1% siliconate | 0.10 | | | | 0.2 |

*ASTM D-822-57T using briquettes.

These results are indicative of the excellent water repellancy and backoxidation resistance that can be obtained in this invention, even at relatively low siliconate concentrations.

Additionally, briquettes treated similarly as above have shown a hydrogen generation rate of less than 0.4 s.c.f.h./ton, whereas untreated briquettes have shown hydrogen generation rates of from 2 to 8 s.c.f.h./ton.

EXAMPLE 3

This example shows the percent water pickup of reduced iron ore briquettes (similar to that used in Example 1) having a porosity of 25 to 30%, at a temperature of 500° F. and dipped for 5 seconds in passivating baths containing 6% polymer (similar to that used in Example 1) in a Varsol diluent and having the polymer/silicone ratio indicated. The coated briquettes were exposed in a weatherometer for 48 hours after which water pickup was measured.

| Polymer/silicone wt. ratio: | Percent H₂O pickup |
|---|---|
| 100:1 | 0.02–0.09 |
| 10:1 | 0.05–0.13 |
| 3:1 | 0.02–0.04 |
| 1:1 | 0.03–0.08 |
| None | 1.2–4.1 |

These results show that the use of silicone and polymer significantly reduces the amount of water pickup of treated reduced iron ore briquettes, even when the silicone is used in relatively small concentrations.

What I claim is:

1. A process for rendering reduced iron orea passive and water-repellant which comprises contacting reduced iron ore having a surface temperature of about 300° F. to about 700° F. with a liquid mixture consisting essentially of a normal liquid polymerizable hydrocarbon olefin having an average carbon number ranging from $C_{20}$ to about $C_{60}$ and at least about .05 wt. percent to 1.0 wt. percent of polymerizable silicone selected from the group consisting of oil soluble and water soluble silicons whereby the liquid mixture penetrates and coats the surface of the reduced ore, drying the liquid mixture which coats the surface of the reduced ore under conditions sufficient to cause polymerization of said liquid mixture, thereby forming a discontinuous hydrophobic resinous deposit on the surface of the iron, which deposit renders the surface passive.

2. The process of claim 1 wherein the silicone is represented by the generic formula:

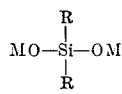

wherein R may be the same or different and is selected from the group consisting of hydrogen and monovalent hydrocarbyl radicals, and M is a Group I metal of the Periodic Chart of the Elements.

3. The process of claim 1 wherein the conditions sufficient to cause polymerization of the liquid mixture comprises temperature of at least about 50° F. and the presence of a silicone curing agent selected from the group consisting of moisture, carbon dioxide, and mixtures thereof.

4. The process of claim 1 wherein the hydrocarbon olefin has an average carbon number ranging from about $C_{20}$ to about $C_{60}$ and comprises at least about 2 wt. percent polyenes based on the total weight of the olefins.

5. A process for rendering a chemically active reduced iron ore passive to back oxidation and hydrogen generation by forming a film thereon which is substantially impervious to moisture which comprises contacting the exterior surface of the reduced ore with a liquid mixture consisting essentially of a normally liquid polymerizable hydrocarbon olefin and at least .05 wt. percent to 1.0 wt. percent of a polymerizable silicone, said olefin having an average carbon number ranging from about $C_{20}$ to about $C_{60}$, the olefin containing about 2 to 15 wt. percent polyenes based on total olefin weight, and said silicone being selected from the group consisting of oil soluble and water soluble silicones, and polymerizing the liquid mixture thereby forming a resinous film on the surface of the reduced iron ore which renders said chemically active ore passive.

6. The process of claim 5 wherein the metal surface at the time of initial contacting ranges from about 1000° F. to about 1800° F. and the liquid mixture is contained in an emulsion with an aqueous medium.

7. The process of claim 5 wherein the film ranges from about 0.05 to 0.2 wt. percent based on the total weight of the passivated metal.

8. The process of claim 5 wherein the silicone is represented by the generic formula:

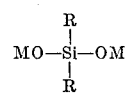

wherein R may be the same or different and is selected from the group consisting of hydrogen and $C_1$ to $C_6$ hydrocarbyl radicals, and M is selected from the group consisting of sodium, potassium and lithium.

9. The process of claim 8 wherein the silicone is sodium methyl siliconate.

10. The process of claim 5 wherein the temperature of the reduced ore surface at the time of initial contacting ranges from about 300° F. to about 700° F. and the temperature of the liquid mixture at the time of initial contacting ranges from about 150° F. to about 300° F.

11. The process of claim 10 wherein the residual heat in the metal after contacting is sufficient to effect substantial polymerization of the olefin.

12. The process of claim 10 wherein the temperature of the exterior surface of the reduced ore is first cooled from a reduction process temperature of about 1000° F. to about 1800° F. to a temperature of about 300° F. to about 700° F. by contacting the reduced ore with an agent which is mildly oxidizing with respect to reduced iron.

13. An article of manufacture comprising discrete particles of reduced iron metal coated with about .2 wt. percent of a film consisting essentially of a mixture of a polymerized silicone and a polymerized olefin hydrocarbon, said polymerized silicone ranging from about .0005 to about 1.0% by weight of the reduced iron

[1] Straight petroleum aliphatic solvents conforming to CS3-40 of the U.S. Department of Commerce commercial standard for Stoddard Solvent and having a minimum Tag closed cup flash point of 100° F.

and said polymerized olefin hydrocarbon being the reaction product of olefins having an average carbon number ranging from about $C_{20}$ to about $C_{60}$.

14. The article of claim 13 wherein the silicone polymer has the generic formula $[R_2SiO=]_n$ wherein $n$ ranges from about 3 to about 20, and R is selected from the group consisting of $C_1$–$C_6$ alkyl radicals and phenyl radicals.

15. The article of claim 13 wherein the discrete particles of reduced iron are in a compacted form.

References Cited

UNITED STATES PATENTS

| | | | |
|---|---|---|---|
| 2,507,200 | 5/1950 | Elliott et al. | 117—139.5X |
| 2,597,276 | 5/1952 | Altmann | 117—100X |
| 2,635,060 | 5/1953 | Cheronis et al. | 260—827X |
| 2,655,489 | 10/1953 | Lawson | 117—132UX |
| 2,716,128 | 8/1955 | West | 260—827UX |
| 2,739,952 | 3/1956 | Linville | 117—161X |
| 2,744,040 | 5/1956 | Altmann | 117—100UX |
| 2,868,766 | 1/1959 | Johannson | 260—448.2X |
| 2,888,419 | 5/1959 | Safford | 260—827X |
| 2,893,898 | 7/1959 | Evans et al. | 117—132X |
| 3,156,668 | 11/1964 | Pike | 260—448.2X |
| 3,222,777 | 1/1966 | Safford | 260—827UX |
| 3,305,504 | 2/1967 | Huntington | 260—827X |

FOREIGN PATENTS

| | | | |
|---|---|---|---|
| 628,814 | 10/1961 | Canada | 260—827 |
| 640,895 | 5/1962 | Canada | 260—827 |
| 735,856 | 6/1966 | Canada | 117—100 |
| 1,229,343 | 11/1962 | France | 117—100 |

WILLIAM D. MARTIN, Primary Examiner

H. J. GWINNELL, Assistant Examiner

U.S. Cl. X.R.

117—132, 135.1